(12) United States Patent
Gao et al.

(10) Patent No.: US 12,333,982 B2
(45) Date of Patent: Jun. 17, 2025

(54) DISPLAY CONTROL METHOD AND ELECTRONIC DEVICE

(71) Applicant: Lenovo (Beijing) Limited, Beijing (CN)

(72) Inventors: Xiaoju Gao, Beijing (CN); Aiguo Zheng, Beijing (CN); Hao Song, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 0 days.

(21) Appl. No.: 18/521,865

(22) Filed: Nov. 28, 2023

(65) Prior Publication Data
US 2024/0221572 A1   Jul. 4, 2024

(30) Foreign Application Priority Data
Dec. 31, 2022   (CN) .......................... 202211741701.1

(51) Int. Cl.
*G09G 3/20*   (2006.01)
*G06F 1/16*   (2006.01)

(52) U.S. Cl.
CPC ......... *G09G 3/2003* (2013.01); *G06F 1/1618* (2013.01); *G09G 2330/021* (2013.01); *G09G 2340/0435* (2013.01)

(58) Field of Classification Search
CPC .......... G06F 3/0412; G06F 3/041–047; G06F 2203/041–04114; G06F 1/3265; G06F 1/1618; G06F 3/1446; G06F 1/1616; G06F 1/1652; G06F 1/1641; G06F 1/1677; G09G 2340/0435; G09G 2330/021; G09G 2354/00; G09G 5/14
See application file for complete search history.

(56) References Cited

U.S. PATENT DOCUMENTS

| | | | |
|---|---|---|---|
| 2011/0002096 A1* | 1/2011 | Thorson | G06F 1/1692 361/679.04 |
| 2018/0261145 A1* | 9/2018 | Peng | G06F 1/3203 |
| 2024/0005838 A1* | 1/2024 | Von Hippel | G09G 3/2092 |

FOREIGN PATENT DOCUMENTS

EP   3958101 A1 *   2/2022   ........... G06F 1/1605

OTHER PUBLICATIONS

EP-3958101-A1 (Year: 2022).*

* cited by examiner

*Primary Examiner* — Sanjiv D. Patel
(74) *Attorney, Agent, or Firm* — ANOVA LAW GROUP, PLLC

(57) ABSTRACT

An electronic device including a first body, the first body being plate-shaped with a first side and a second side opposite the first side; a second body, the second body being plate-shaped, rotatably connected to the first body through a connecting device, with a third side and a fourth side opposite the third side; and a display device disposed on the first side, including a display unit set, the display device being configured to present an image, where the display unit set is configured to present three or more colors, and the image is perceived by a viewer after being illuminated by light.

15 Claims, 4 Drawing Sheets

DISPLAY CONTROL METHOD AND ELECTRONIC DEVICE

CROSS-REFERENCES TO RELATED APPLICATION

This application claims priority to Chinese Patent Application No. 202211741701.1 filed on Dec. 31, 2022, the entire content of which is incorporated herein by reference.

FIELD OF TECHNOLOGY

The present disclosure relates to the field of display processing technology and, more specifically, to a display control method and an electronic device.

BACKGROUND

Electronic devices play an increasingly important role in daily life. As the amount of time users need to use electronic devices per day gradually increases, users are increasingly paying attention to the damage to eyes caused by the screens of electronic devices. Accordingly, there is an urgent need for electronic devices that can not only meet user's needs for various tasks, but also have reduced visual damage effect.

SUMMARY

One aspect of this disclosure provides an electronic device. The electronic device includes a first body, a second body, and a display device. The first body is plate-shaped with a first side and a second side opposite the first side. The second body is plate-shaped, rotatably connected to the first body through a connecting device, with a third side and a fourth side opposite the third side. The display device is disposed on the first side and includes a display unit set. The display device is configured to present an image. The display unit set is configured to present three or more colors, and the image is perceivable by a viewer after being illuminated by light.

Another aspect of this disclosure provides a display control method. The display control method includes determining an operating mode of an electronic device based on a posture of the electronic device, determining a refresh rate range of a display device based on the operating mode of the electronic device, and controlling the refresh rate of the display device based on the refresh rate range. The electronic device includes a plate-shaped first body and a plate-shaped second body. The first body and the second body are rotatably connected. The display device is disposed on the first side of the first body. A display unit set of the display device is configured to present three or more colors. The display device is configured to present an image to be perceivable by a viewer after being illuminated by light.

Another aspect of this disclosure provides non-transitory computer-readable storage medium storing computer program instructions executable by at least one processor to perform a display control method as described herewith.

BRIEF DESCRIPTION OF THE DRAWINGS

In order to illustrate the technical solutions in accordance with the embodiments of the present disclosure more clearly, the accompanying drawings to be used for describing the embodiments are introduced briefly in the following. It is apparent that the accompanying drawings in the following description are only some embodiments of the present disclosure. Persons of ordinary skill in the art can obtain other accompanying drawings in accordance with the accompanying drawings without any creative efforts.

DETAILED DESCRIPTION

Technical solutions of the present disclosure will be described in detail with reference to the drawings. It will be appreciated that the described embodiments represent some, rather than all, of the embodiments of the present disclosure. Other embodiments conceived or derived by those having ordinary skills in the art based on the described embodiments without inventive efforts should fall within the scope of the present disclosure.

Figure 1:
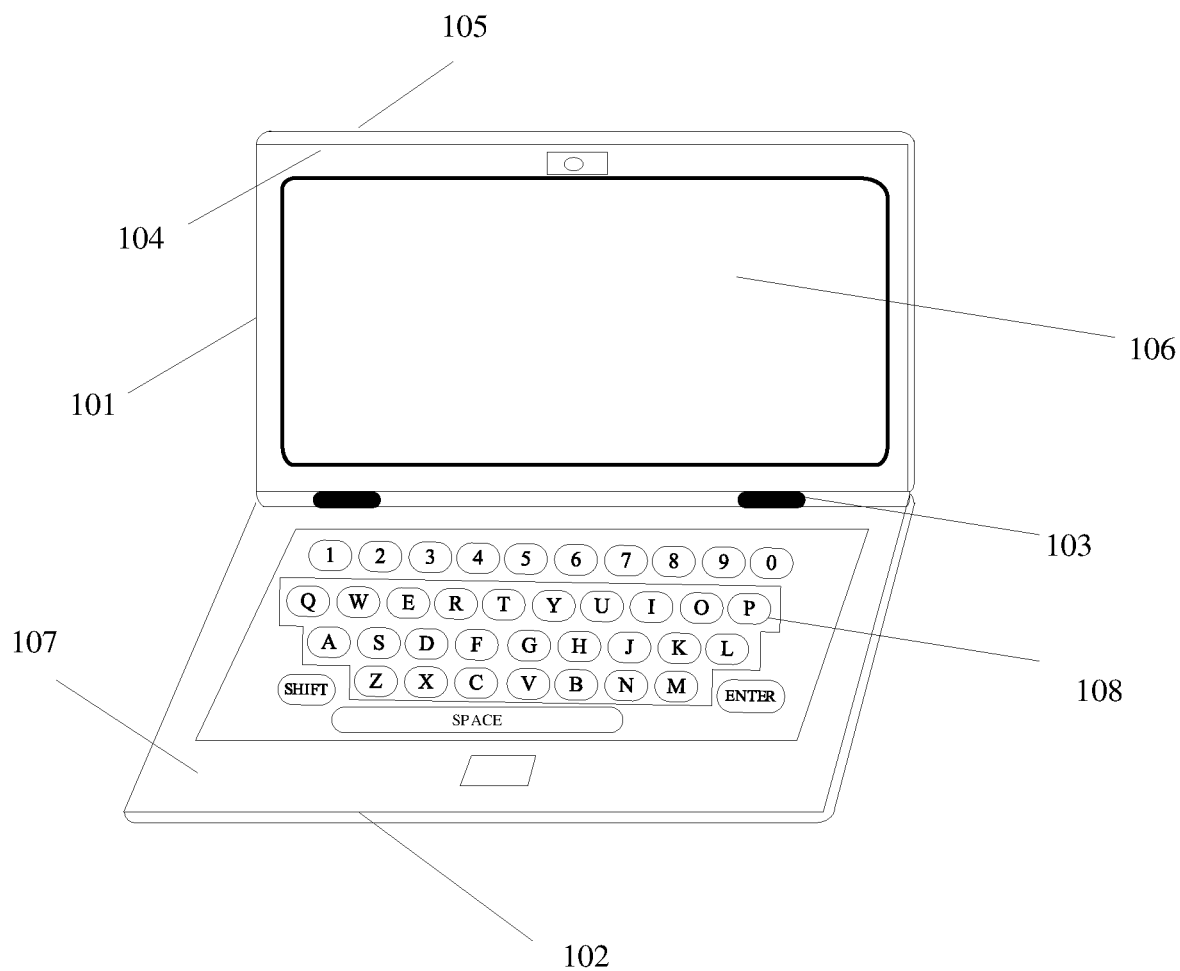
FIG. 1 is a schematic structural diagram of an electronic device according to an embodiment of the present disclosure.

FIG. 1 is a schematic structural diagram of an electronic device according to an embodiment of the present disclosure.

As shown in FIG. 1, the electronic device includes a first body 101 and a second body 102.

In some embodiments, the second body 102 may be rotatably connected to the first body 101 through a connecting device 103. The connecting device 103 allows the first body 101 and the second body 102 to rotate relative to each other.

It should be understood that the connecting device can take many forms. For example, in FIG. 1, the connecting device includes two rotating shaft components. Of course, the connecting device can also be a single rotating shaft component or other forms, as long as it can rotatably connect the first body and the second body. The present disclosure does not limit the specific form of the connecting device.

In some embodiments, both the first body and the second body may be plate-shaped. In FIG. 1, the first body and the second body are both rectangular flat plates with a certain thickness as an example. Of course, the first body and the second body may also have other plate shapes, which is not limited in the embodiments of the present disclosure.

The first body 101 includes opposing first side 104 and second side 105. As shown in FIG. 1, the first side and the second side of the first body are parallel and back-to-back sides. A display device is arranged on the first side 104 of the first body 101. A shell of the first body may be arranged on the second side 105 of the first body, and other components may also be provided as needed, which is not limited in the embodiments of the present disclosure.

Similarly, the second body 102 also includes opposing third side 107 and fourth side. The third side 107 of the second body is shown in FIG. 1, and the four side of the side of the second body faces away from the third side.

In some embodiments, the third side of the second body may be provided with an interaction device 108. The interaction device 108 may be used to realize human-computer interaction between the electronic device and the user.

It can be understood that FIG. 1 takes the interaction device as a keyboard as an example. In practical applications, the interaction device may also include a touch panel, etc.

It can be understood that the interactive device may also be an interactive device that supports both display and touch functions. For example, the display device provided on the first side of the first body may be a first display device, and the interactive device may be a second display device that supports touch input and information display. The second display device may not only support image display, but also support users to input information through touch operations to better realize human-computer interaction.

In some embodiments, the display principle of the second display device may be the same or different from the display principle of the first device, which is not limited in the embodiments of the present disclosure.

Of course, the interactive device provided in the electronic device may also have other capabilities, which are not limited in the embodiments of the present disclosure.

In the embodiments of the present disclosure, the display device provided on the first side of the first body is used to present images. The display device may include a collection of display units, and the display units may be units for presenting colors.

The set of display units may present at least three colors. The at least three colors that the display unit set can present may include at least one color other than black and white. In particular, the display unit set may present more than three types of colors such that the display device can support the display of color images.

For example, the display unit set may not only present black, white, and gray, but may also present a variety of colors other than black, white, and gray such that the display device not only supports black and white images, but also supports the display of color images.

In some embodiments, the display unit set may include a plurality of display units capable of presenting colors.

In the embodiments of the present disclosure, the image presented by the display device may be perceivable by the viewer after being illuminated by light. That is, the image presented by the display device can enter the eyes of the viewer relying on the reflection of external light from the electronic device.

Consistent with the present disclosure, in the electronic device, the first body and the second body can be rotationally connected through a connecting device, and a display device can be provided on the first side of the first body. In this way, operating habits of different users of the electronic device can be satisfied by adjusting the relative positional relationship between the first body and the second body. In addition, the display unit provided on the first body can present at least three colors to meet the user's display needs for different colors. Further, the image presented by the display unit can be perceivable by the viewer after being illuminated by light. Since the image presented by the display device is seen by the user based on light reflection, it can effectively reduce the damage to the user's eyes, thereby reducing the damage to the user's eyes while meeting the operating habits of different users. In addition, since the image presented by the display device can be seen by the viewer after being illuminated by light, power consumption can be effectively reduced.

In addition, since the display device in the present disclosure can present at least three colors, the image effect presented by the display device can reach the image effected presented by conventional display devices (such as OLED and other display devices) to meet the viewing needs of users.

Further, since the image presented by the display device can rely on reflection of external light to enter the viewer's eyes, in the present disclosure, the display device can emit images into human eyes without relying on the light emitted by the display device or the backlight component associated with the display device.

In the present disclosure, the display device can take various forms as long as the display device can support at least three colors, and the image presented by the display device can be reflected into human eyes with the help of external light. The specific form of the display device is not limited to the embodiments of the present disclosure. For clarity, several possible arrangements of the display device are described below as examples.

In some embodiments, the display unit set may include a plurality of display units. The plurality of display units may include at least three types of charged particles, and different charged particles may have different color attributes. Each display unit may be thought of as a transparent capsule containing multiple electrically charged particles. There are various combinations of at least three types of charged particles. For example, each display unit may include charges with black dye, charges with white dye, and at least one charge with dye of other colors other than black and white.

Correspondingly, by controlling the distribution of at least three types of charged particles in the display unit by applying a voltage to the display unit, one display unit may display at least one color, and the display unit set may display at least three colors.

In some embodiments, the display unit set may include a plurality of display units. More specifically, the display unit set may include a plurality of display unit groups, where each display unit group may include at least three display units and a filter film covering the display units. Each display unit may include charged particles of two different colors, and the color of the filter film covering the different display units in the same display unit group may be different.

Correspondingly, for each display unit group, by applying a voltage to each display unit in the display unit group and controlling the distribution of two types of charged particles in each display unit, the color of the light mixed by the filter films on at least three display units in the display unit group can be charged after being illuminated by light from outside the electronic device. Since different display unit groups may be able to present different colors, the display unit set may ultimately be able to present at least three different colors.

For example, each display unit in the display unit group may include black charged particles and white charged particles, and the same display unit group may include at least a display unit covered with a red filter film, a display unit covered with a green filter film, and a display unit covered with a blue filter film.

Based on this, by controlling the voltage applied to different display units in the display unit group, the distribution of charged particles in different display units in the display unit group can be controlled, the color ratio of red, yellow, and blue that needs to be mixed by at least three display units in the display unit group to be reflected by external light can be changed, and the light color after mixing the at least three colors can be presented.

For example, assume that the display unit group includes a display unit A covered with a red filter film, a display unit B covered with a green filter film, and a display unit covered with a blue filter film, and these three display units include black charged particles and white charged particles.

Assume that the display unit group needs to present the color of green, the voltage applied to each display unit in the display unit group can be controlled such that the black charged particles in the display unit A and display unit C are facing upward, while the white charged particles are facing downward.

Figure 2:
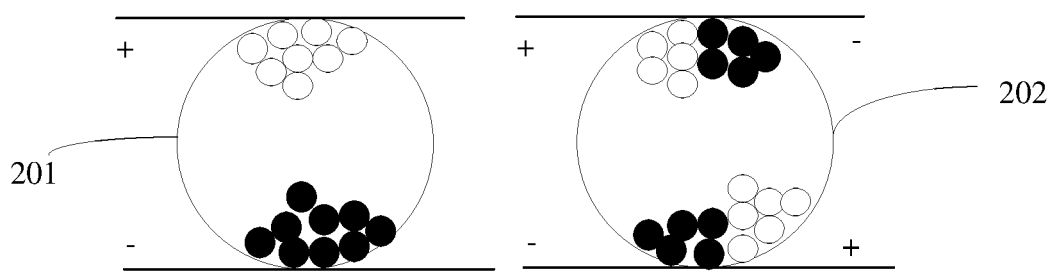
FIG. 2 is a schematic distribution diagram of two types of charged particles in a display unit of the electronic device according to an embodiment of the present disclosure.

For ease of understanding, reference can be made to FIG. 2, which is a schematic distribution diagram of two types of charged particles in display unit 201. After an electric field as shown in FIG. 2 is applied to the display unit 201, the white charged particles (shown as white circles in FIG. 2) in the display unit 201 move upward, while the black charged particles (shown as black circles in FIG. 2) move downward. As for display unit 202, after applying the electric field as shown in FIG. 2, some of the white charged particles in the display unit 202 move upward, and some of the white charged particles move downward. Similarly, some of the white charged particles move upward and some of the black charged particles move downward. Of course, FIG. 2 is an example illustration to facilitate understanding of the movement and distribution of charged particles in the display unit, the specific method of controlling the distribution of charged particles in the display unit is not limited in the embodiments of the present disclosure.

Although the tops of the display units A and C are covered with colored filter films, since all the black charged particles in the display units A and C are located at the top, the filter films on the display units A and C will not reflect cover from external light. For display unit B, the applied voltage can be controlled such that the white charged particles in display unit B are on top and the black charged particles are at the bottom. In this way, the green filter film above display unit B has a substrate formed of white charged particles such that green color of the green filter film can be reflected after light illuminates the display unit B.

Of course, the description above is only an example. In practical applications, the voltage applied to each display unit can be controlled as needed, and the proportion of upward and downward charged particles of each color in each display unit can also be controlled. In this way, the proportion of the color reflected by the filter film on each display unit in each display unit group can change to change the final color presented after mixing the colors reflected by the filter films on at least three display units in the display unit group.

The specific form of the display device is not limited to the embodiments of the present disclosure. For example, the display device may be a color electronic ink screen. With the development of technology, the display device can also be other display devices that can reflect the image presented by the display device into the human eyes with the help of external light, which is not limited in the embodiments of the present disclosure.

It should be understood that since the first body and the second body of the electronic device can rotate relative to each other through the connecting device, the electronic device can have a variety of different postures, which will be described below.

In some embodiments, the first body and the second body of the electronic device may rotate relative to each other through the connecting device such that the electronic device can switch between a first posture and a second posture.

In some embodiments, when the electronic device is in the first posture, the first body and the second body may satisfy an overlapping condition, and the second side of the first body may exposed; when the electronic device is in the second posture, the first body and the second body may satisfy the overlapping condition, and the first side of the first body may be exposed.

In some embodiments, the overlapping condition may be a condition representing that the first body and the second body overlap each other.

For example, if the first body and the second body meet the overlapping condition, the first body and the second body may be mutually attached.

In another example, considering that in practical applications, the first body and the second body may not completely overlap, or even if the first body and the second body are in a nearly overlapping state, the electronic device may actually enter the first posture or the second posture. Based on this, the corresponding first body and the second body can meet each other. The first body and the second body satisfying the overlapping condition may be that the angle between the first body and the second body is less than a set angle. The angle at this time may refer to the angle between the side of the first body facing the second body and the side of the second body facing the first body. For example, the overlapping condition between the first body and the second body may be that the minimum angle between the first body and the second body is between 0° to 10°.

It should be understood that in the present disclosure, the connecting device of the electronic device can be implemented in a variety of ways. Therefore, when the first body and the second body meet the overlapping condition, there are many possible implementations to expose the first side or the second side of the first body.

For example, the first body may be rotated around a first reference and a second reference through the connecting device. The first reference may be parallel to the side of the first body adjacent to the connecting device. By rotating the first body around the first reference, the first body may rotate around the second body. The second reference may meet the perpendicular condition with the first reference, and meet the parallel condition with the first side of the first body. By rotating the first body around the second reference, the first side or the second side of the first body may be directed toward the third side of the second body, that is, the first side and the second side of the first body may be flipped.

Based on this, when the first body and the second body meet the overlapping condition, there are many possibilities where the second side of the first body is exposed, and the second side of the second body is exposed.

In some embodiments, the connecting device may enable relative circumferential rotation between the first body and the second body.

For example, the angle between the first body and the second body may be rotated from 0° to 360° through the connecting device. Of course, this is just an example. The minimum angle between the first body and the second body may reach 0° or close to 0°. For example, the minimum angle may be less than 5°. Similarly, the maximum angle may be 360° or close to 360°. For example, the maximum angle may be greater than 350°.

Correspondingly, when the electronic device is in the first posture, the first side of the first body may face the third side of the second body, and when the electronic device is in the second posture, the second side of the first body may face the fourth side of the second body. This implementation will be described with reference to FIG. 1 below.

In the state of the electronic device shown in FIG. 1, the first body 101 is rotated in the direction toward the third side 107 of the second body 102 such that the first body and the second body overlap or substantially overlap, which places the electronic device in the first posture.

In the first posture, since the first side of the first body faces the third side of the second body, and the first side of the first body fits or substantially fits the third side of the second body, the first side of the first body cannot be exposed, and the third side of the second body cannot be exposed either. In this way, the user cannot see the display device on the first side of the first body and the interactive device on the third side of the second body. The second side of the first body (such as the back shell of the first body) can be exposed such that the user can see the second side of the first body.

Figure 3:
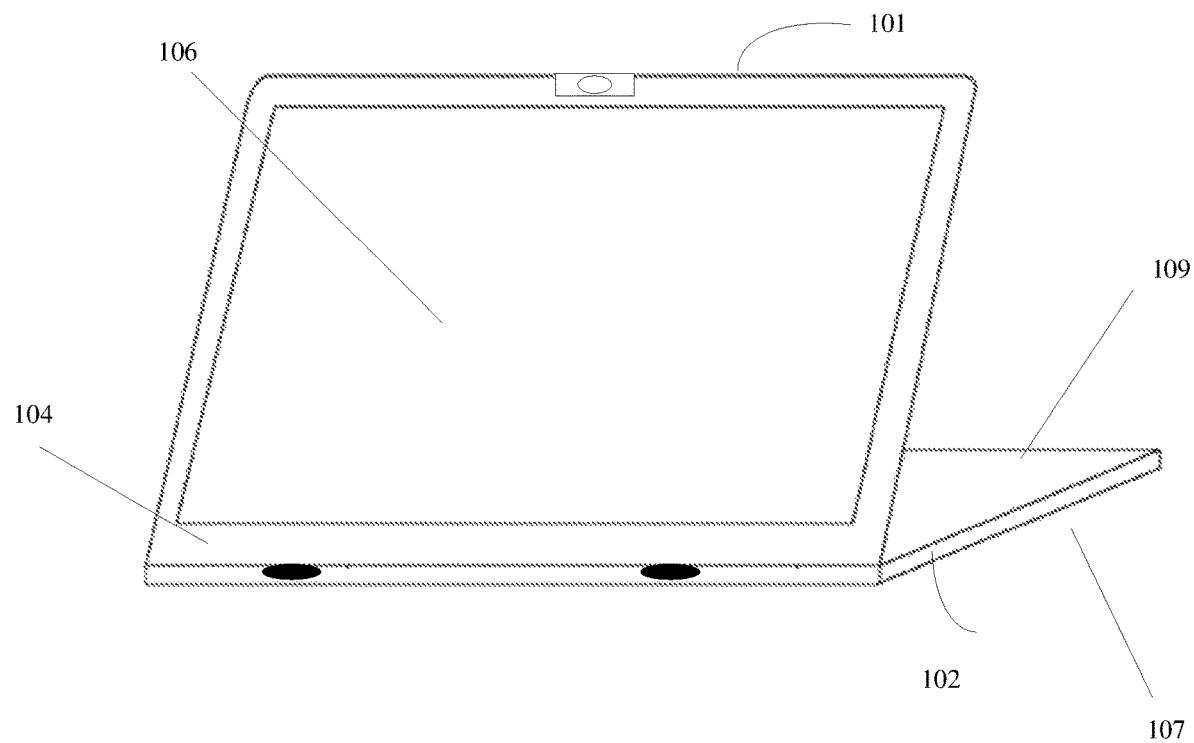
FIG. 3 is a schematic structural diagram of the electronic device according to an embodiment of the present disclosure.

In the state of the electronic device shown in FIG. 1, if the first side 104 of the first body 101 is rotated toward the side away from the second body, the electronic device can gradually rotate from the first side of the first body toward the third side of the second body to the second side of the first body toward the fourth side of the second body, as shown in FIG. 3. FIG. 3 is a schematic diagram of a state of the electronic device as the first body rotates relative to the second body.

Comparing FIG. 1 and FIG. 3, it can be seen that after the first side 104 of the first body 101 is rotated toward the side away from the second body 102, the first side 104 of the first body 101 is no longer on the side of the second body 102, and the second side 105 of the first body 101 is on the side of the second body 102. As shown in FIG. 3, the first side 104 of the second body 102 is away from the third side 107 of the second body 102, and the second side of the first body (not marked in FIG. 3) opposite to the third side 107 faces toward the fourth side 109 of the second body 102.

Figure 4:
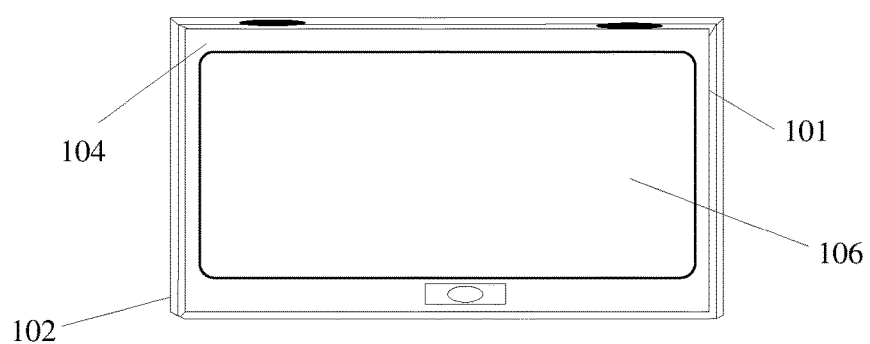
FIG. 4 is a schematic structural diagram of the electronic device according to an embodiment of the present disclosure.

Based on FIG. 3, the second side 105 of the first body 101 can continue to rotate toward the second body 102, and the second side of the first body and the fourth side of the second body can overlap or substantially overlap such that the electronic device can be placed in the second posture, as shown in FIG. 4. As shown in FIG. 4, when the electronic device is in the second posture, the first side 104 of the first body 101 is exposed such that the user can see the display device 106 on the first side 104 of the first body 101. Since the second side of the first body 101 faces the second body 102 and meets the overlapping condition with the second body 102, the second side of the first body cannot be exposed.

Based on the above description, when the electronic device is in the first posture, the first side of the first body cannot be exposed. Therefore, the display device on the first side of the first body cannot be exposed, and the user cannot view the display content of the display device. At this time, the display device is in an unavailable state, and the electronic device can also be in a non-use mode (that is, an unusable state).

When the electronic device is in the second posture, the first body and the second body satisfy the overlapping condition, and the first side of the first body is exposed, and the user can view the display device on the first side of the first body. At this time, the electronic device is equivalent to a tablet computer with such as a display device. In addition, due to the characteristics of the display device, the user can perform operations related to the tablet computer while reducing damage to the user's eyes.

It should be understood that the electronic device in the present disclosure may also have other postures. More specifically, the first body and the second body may rotate relative to each other through the connecting device such that the electronic device can switch between the first posture, the second posture, and a third posture.

When the electronic device is in the third posture, the angle between the first body and the second body of the electronic device may be between a first limit angle corresponding to the first posture and a second limit angle corresponding to the second posture.

In some embodiments, the first limit angle may be the minimum angle between the first body and the second body of the electronic device in the first posture, and the second limit angle may be the maximum angle between the first body and the second body in the second posture.

Based on the previous description, in the first posture, the second side of the first body is exposed, and the first side faces the side of the second body. Therefore, the first limit angle may be the minimum angle between the first side of the first body and the second body. For example, in the first posture, the first side of the first body faces the third side of the second body, then the first limit angle may be the angle between the first side of the first body and the third side of the second body when the first body and the second body meet the overlapping condition.

Similarly, in the second posture, since the first side of the first body is exposed, at this time, the maximum angle between the first body and the second body may be the maximum angle between the first side of the second body and the second body. For example, if the second posture of the electronic device is as shown in FIG. 4, the second limit angle may be the angle between the first side of the first body and the third side of the second body.

Therefore, when the electronic device is in the third posture, the display device on the first side of the first body of the electronic device can be seen by the user, and the electronic device is in the non-tablet mode.

In some embodiments, when the electronic device is in the third posture, the angle between the first side of the first body and the third side of the second body may be between 75° and 180°. In this case, the electronic device can actually be considered to be in a laptop mode as shown in FIG. 1, which is a schematic diagram of the electronic device in the third posture. In this case, the user can view the display device on the first side of the first body while operating the interactive device on the second body. In addition, since the display device is less harmful to the user's eyes, the visual damage caused by the user operating the laptop for a long time can be reduced.

In some embodiments, the electronic device being in the third posture may also include: the overlapping condition between the first body and the second body not being met, and the angle between the first body and the second body being less than 75°. As shown in FIG. 3, which is another possible arrangement of the electronic device in the third posture. Of course, based on FIG. 3, if the electronic device is erected such that the first body and the second body support each other to form a tent mode can also be considered as another arrangement of the electronic device in the third posture, which will not be described in detail here.

It should be understood that the electronic device may also include a processing device, which may be connected to the display device and used to control the display device to display content. For example, the processing device may be connected to the display control unit of the display device, and the processing device may issue control instructions to the display control unit, thereby controlling the display of the display device through the display control unit.

In the embodiments of the present disclosure, every time the display device presents new content, a voltage needs to be applied to each display unit in the display unit set of the display device to change the arrangement of the charged particles in the display unit. The speed at which the display device displays content is related to the refresh speed (also referred to as refresh rate) of the display device. Based on this, considering the different postures of the electronic device, the operations performed by the user using the electronic device will also be different. Therefore, the display device in the present disclosure may be configured to adjust the refresh rate of the display device based on the posture of the electronic device.

In some embodiments, the maximum refresh rate of the display device may reach 20 Hz. Based on this, the processing device can reasonably adjust the refresh rate of the display device based on the posture of the electronic device.

To clearly describe the processing device's control of the refresh rate of the display device of the electronic device, a display control method will be described in detail with reference to FIG. 5.

Figure 5:
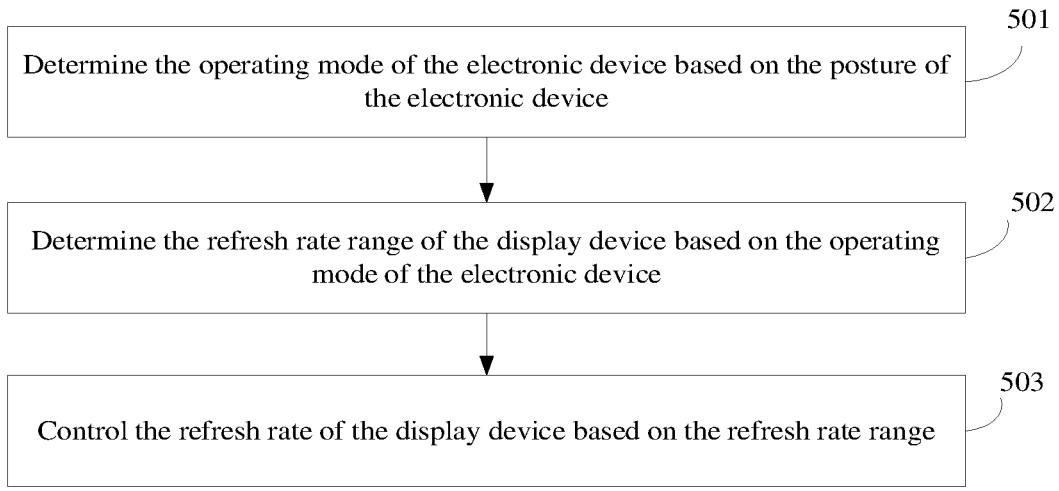
FIG. 5 is a flowchart of a display control method according to an embodiment of the present disclosure.

FIG. 5 is a flowchart of a display control method according to an embodiment of the present disclosure. The display control method can be applied to the electronic device in any of the foregoing embodiments. The method will be described in detail below.

501, determining the operating mode of the electronic device based on the posture of the electronic device.

Based on the description of the foregoing embodiments, the electronic device can correspond to different operating modes based on the different postures of the electronic device.

502, determining the refresh rate range of the display device based on the operating mode of the electronic device.

In some embodiments, the operating mode of the electronic device can characterize the way user use the electronic device and the operation content that users can operate on the electronic device. Based on this, when the operating modes of the electronic device are different, in order to meet the users' viewing needs, the refresh rate required by the display device will also be different.

In some embodiments, the refresh rate range corresponding to different operating modes can be set. Based on this, after determining the current operating mode of the electronic device, a suitable refresh rate range of the display device may be determined.

For example, the postures of the electronic device may include at least a first posture, a second posture, and a third posture.

When the electronic device is in the first posture, the display device of the electronic device is not exposed, the user cannot view the display device, and the electronic device is in a non-use mode at this time. When the electronic device is in the non-use mode, the user cannot use the electronic device normally and cannot view or input information using the interactive device of the electronic device. In this case, the electronic device does not need to refresh the display device and can determine the refresh rate range of the display device to be zero.

Correspondingly, when the electronic device is in the second posture, the electronic device can be determined to be in the first operating mode. In this case, the display device can be determined to be in a first refresh rate range.

When the electronic device is in the third posture, the electronic device can be determined to be in a second operating mode. In this case, the display device can be determined to be in a second refresh rate range, where the second refresh rate range is different from the first refresh rate range.

Based on the foregoing descriptions, when the electronic device is in the second posture, the first operating mode of the electronic device can be regarded as a tablet operating mode. In this case, the user mainly performs operations related to the tablet computer mode, such as reading, writing, and drawing operations, and the user has relatively low requirements for the refresh speed of the display device. When the electronic device is in the third posture, the second operating mode of the display device can be regarded as a laptop operating mode. In this case, the user can use the electronic device to perform webpage processes and various office operations. Therefore, the user has relatively high requirements for the refresh rate of the display device.

Based on this, in the present disclosure, the maximum refresh rate in the second refresh rate range may be greater than the maximum refresh rate in the first refresh rate range. For example, the first refresh rate range may be 2.5 Hz-8 Hz, and the second refresh rate range may be 2.5 Hz-20 Hz. Of course, the detail of the refresh rate ranges can be set based on actual needs, and is not limited to the embodiments of the present disclosure.

503, controlling the refresh rate of the display device based on the refresh rate range.

In the current mode of the electronic device, the refresh rate of the display device may be controlled based on the refresh rate range corresponding to the mode such that the refresh rate can be within the refresh rate range.

In practical applications, within the refresh rate range corresponding to the current mode of the electronic device, the refresh rate of the display device may also be reasonably adjusted based on the type of display content being displayed by the display device and the mode of operating scene set by the user.

In the present disclosure, the rotation of the first body and the second body of the electronic device through the connecting device enables the electronic device to be in different modes. Based on this, based on the characteristics of the display device of the electronic device in presenting images, the present disclosure can reasonably determine the suitable refresh rate range of the display device of the electronic device based on the mode in which the electronic device is in, and control the refresh rate of the display device within the determined refresh rate range. In this way, the type of display device that is less harmful to the user's eyes can be used to display content, and at the same time, the refresh rate can be reasonably controlled, thereby meeting the needs of users in different operating modes to present display content through the display device.

It should be understood that when the electronic device is in different modes, the way the user operates the refresh rate range will be different. In order to adapt to the user's operating habits, when the electronic device is in different modes, the electronic device may run different operating systems.

For example, when the electronic device in the first operating mode corresponding to the second posture, the electronic device can be regarded as being in the tablet mode, and the user can perform input operations through touch operations on the display device. Based on this, the electronic device can run a first operating system and a first application program based on the first operating system. For example, the first operating system may be the Android operating system.

Correspondingly, when the electronic device is in the second operating mode corresponding to the third posture, the electronic device can be regarded as being in the laptop mode. In this case, the user can complete information input and device control operations through the keyboard and touch panel on the second body of the electronic device. Based on this, the electronic device, the electronic device can run a second operating system and a second application program based on the second operating system. For example, the second operating system may be a Windows® operating system. For distinction, the present disclosure refers to an application program that relies on the first operating system to run as a first application program, and an application program that relies on the second operating system to run as a second application program.

Of course, when the electronic device is in the second posture and the electronic device is in the mode shown in FIG. 3 or the tent mode, the same applies to the control operation of the electronic device in the second operating mode, which will not be repeated here.

In some embodiments, in order to reduce the development difficulty or improve the operation reliability of the electronic device, only one operating system may be deployed in the electronic device in the present disclosure.

For example, when the electronic device is in the first operating mode corresponding to the second posture, the electronic device may run the first operating system, and one or more first application programs may be run based on the first operating system.

When the electronic device is in the second operating mode corresponding to the third posture, the electronic device may run the first operating system and an operating system simulation program based on the first operating system. The operating system simulation program may be a program that runs based on the first operating system and may be used to simulate the second operating system. Based on this, when the electronic device is in the second operating mode, the second application program that relies on the second operating system can be run based on the operating system simulation program.

For example, when the electronic device is in the first operating mode, the electronic device may run the second operating system and the operating system simulation program based on the second operating system. In this case, the operating system simulation program can be used to simulate the first operating system. Correspondingly, when the electronic device is in the first operating mode, running the simulation program based on the operating system may require running the first application program based on the first operating system. When the electronic device is in the first operating mode, only the second operating system may need to be run.

For example, if the second operating system is a Windows® operating system and the first operating system is an Android operating system, then the Windows® operating system and an operating system simulator for simulating the Android system can be deployed on the electronic device. Based on this, the electronic device can always run the Windows® operating system after it is started. When the electronic device is in the first operating mode, the electronic device can run an application program suitable for the Android operating system by running the operating system simulator for simulating the Android operating system.

It should be understood that after determining the refresh rate range of the display device based on the operating mode of the electronic device, in order to meet the refresh rate requirements of different application programs and minimize power consumption, the present disclosure also provides a method to reasonably control the refresh rate of the display device in combination with the application programs currently running on the electronic device.

Figure 6:
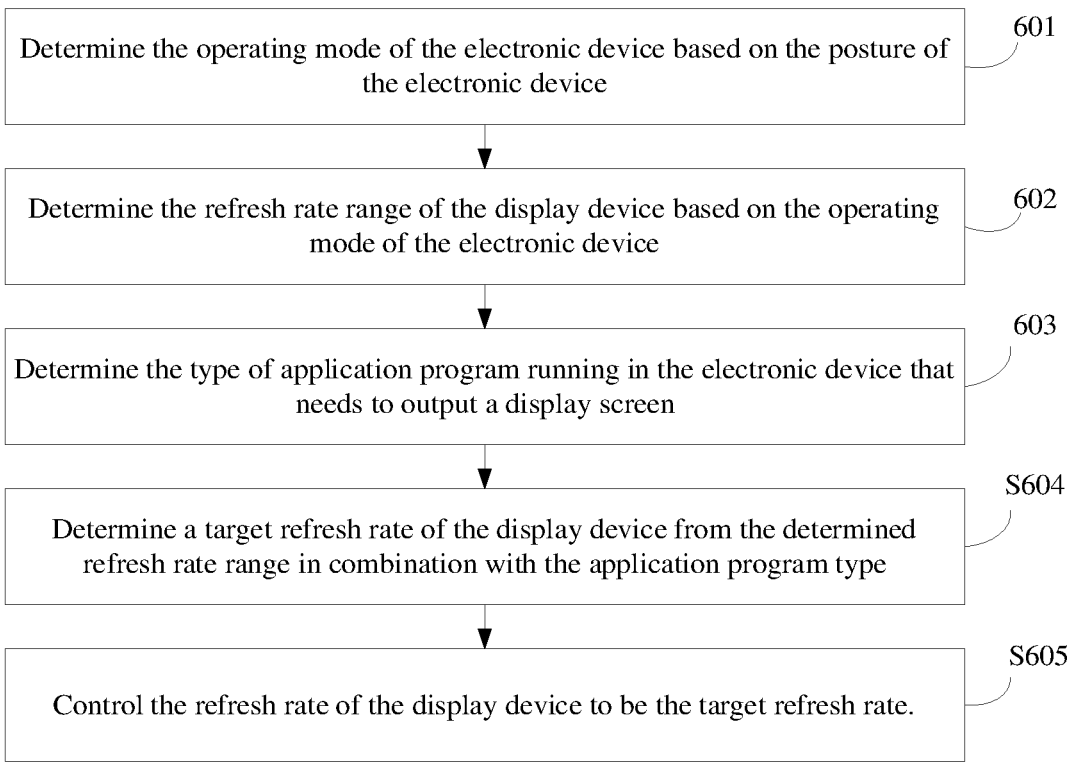
FIG. 6 is a flowchart of the display control method according to an embodiment of the present disclosure.

FIG. 6 is another flowchart of the display control method according to an embodiment of the present disclosure. The method can be applied to the electronic device described in the foregoing embodiments. The method will be described in detail below.

601, determining the operating mode of the electronic device based on the posture of the electronic device.

602, determining the refresh rate range of the display device based on the operating mode of the electronic device.

For the detailed description of the processes at 601 and 602, reference can be made to the relevant description in the foregoing embodiment, which will not be repeated here.

603, determining the type of application program running in the electronic device that needs to output a display screen.

In some embodiments, the type of application program may be used to characterize the application program's requirement for the refresh rate of the display screen.

The types involved in the application programs may be set based on actual needs. For example, the types of application programs may be divided into office application programs (such as office applications), application programs that provide web services, slideshow application programs, and image display application programs.

It should be understood that since different types of application programs can provide different services to users, the refresh rate of the screen required by different types of application programs may also be different. For example, for office application programs, users operate this type of application programs more frequently. For example, the user may frequently input information or modify the screen displayed by the application program. It can be seen that for office application programs, the refresh rate of the display screen will be relatively high, and in order to ensure reliable presentation of the display screen, the display device needs to have a relatively high refresh rate. In another example, for web service application programs, after this type of application program displays a web page, users will generally request a new web content after browsing the web content currently being displayed. Therefore, the refresh rate of the display screen of this type of application programs will be relatively lower than the refresh rate requirement of office application programs. Therefore, the refresh rate requirement of the display device will be relatively low.

Based on this, in order to be able to control the refresh rate of the display device more reasonably, the display control method also needs to determine the type of application program currently running on the electronic device that needs to output a display screen to the display device.

In particular, if there are multiple application programs currently running in the electronic device that need to output display screens, the application program type corresponding to the application program currently outputting the display screen at the top level of the interface of the display device may be determined; or, the type of each application program may be determined separately, which is not limited in the embodiments of the present disclosure.

It should be noted that the order of the processes at 602 and 603 is not limited to the order shown in FIG. 6. In practical applications, the processes at 602 and 603 can be interchanged or executed synchronously.

604, determining a target refresh rate of the display device from the determined refresh rate range in combination with the application program type.

In the present disclosure, after determining the refresh rate range suitable for the current operating mode of the electronic device, the refresh rate currently suitable for the display device of the electronic device also needs to be determined from the refresh rate range based on the application program type. For distinction, the refresh rate determined from the refresh rate range can be referred to as the target refresh rate.

It should be understood that the target refresh rate is actually a refresh rate suitable for the display device that is comprehensively determined based on the operating mode of the electronic device and the application program type initiated by the electronic device in the current mode.

The target refresh rate can be determined using different methods. In some embodiments, based on the refresh rate range corresponding to each operating mode, the corresponding relationship between different application program types and refresh rates in that operating mode may be established. Based on this, based on the type of application program currently running on the electronic device and the corresponding relationship, a target refresh rate suitable for the application program can be determined from the refresh rate range.

The process of determining the target refresh rate based on the type of application program when the electronic device is in the first operating mode corresponding to the second posture will be described below.

When the electronic device is in the first operating mode corresponding to the second posture, since the first operating mode can be regarded as the tablet mode, and in this operating mode, user generally tend to use the electronic device for reading, drawing and some light office operations, therefore, the maximum refresh rate of the electronic device in this operating mode can be relatively low. In addition, in this operating mode, users generally have relatively low requirements for the refresh rate of the display screen of each application program.

Assume that the first refresh rate range corresponding to the first operating mode of the electronic device is 2.5 Hz-8 Hz.

When the electronic device is in the first operating mode, if the application program currently running on the electronic device is a reading application program, such as a reading application program that provides article services such as novels, etc., since reading an article requires reading one page before turning to the next page, the target refresh rate corresponding to the reading application program may be 2.5 Hz.

When the electronic device is in the first operating mode, if the application program currently running on the electronic device is an office application program or other office-related application program, such application program has relatively high requirements for the refresh rate of the display screen. However, since the electronic device is currently in tablet mode, users can only use this type of application program to perform some relatively simple office operations. In the first operating mode, the refresh rate applicable to this type of application program should also be within the refresh rate range of the first operating mode, but it may be set to the highest refresh rate within the refresh rate range, that is, the target refresh rate applicable to the current display device may be determined to be 8 Hz.

The following description takes the second operating mode corresponding to the third posture of the electronic device as an example.

When the electronic device is in the second operating mode, the electronic device may be in the laptop operating mode. Compared with the tablet mode, the laptop mode has relatively higher requirements for office work, etc. The refresh rate of the display screen of office application programs is higher, and the refresh rate of other types of application programs may also be higher than the refresh rate required by such application programs in the first operating mode. Based on this, the second refresh rate range corresponding to the second operating mode may be 2.5 Hz-12 Hz.

Based on this, when the electronic device is in the second operating mode, if the currently running application program is an office application program such as Office, in order to ensure that the user can work reliably, the refresh rate of the display device may be adjusted to the highest refresh rate within the second refresh rate range. For example, the target refresh rate may be set to 12 Hz.

When the electronic device is in the second operating mode, if the currently running application program is an application program that provides web page services, then, considering that browsing the web page takes a certain amount of time, the refresh rate of web pages will be lower than the screen refresh rate for office application programs. Therefore, the target refresh rate applicable to this type of application program may be set to 8 Hz, and the target refresh rate used by the display device may be controlled to be 8 Hz.

S605, controlling the refresh rate of the display device to be the target refresh rate.

In this embodiment, the refresh rate of the display device can be controlled based on the operating mode of the electronic device in combination with the type of application program running in the operating mode. In this way, the refresh rate of the display device can be more reasonably controlled and the power consumption of the electronic device can be reduced while meeting the user's needs for different operating modes of the electronic device.

It should be understood that under the current operating mode of the electronic device, different users or the same user in different scenarios may have different requirements for the refresh rate of the display screen of the same application program. Based on this, in order to more reasonably control the refresh rate of the display device, after controlling the refresh rate of the display device to the target refresh rate, the display control method may also be used to determine the frequency of user input operations for the currently running application program. Correspondingly, the refresh rate of the display device can be adjusted based on the operation frequency and the determined refresh rate range.

The operation frequency of the user's input operation to the application program may include one or more of: the frequency of inputting information to the application program, and the frequency of adjusting the update operation that triggers updating of the screen output by the application program. Of course, the operating frequency of the input operation may also be characterized by the input speed of the input operation, which is not limited in the embodiments of the present disclosure.

In some embodiments, inputting information into the application program may be applying input to the application program to edit, modify, or add content, such as inputting or editing content into a document in a document application program.

The update operation that triggers the update of the screen output by the application program may be an operation that triggers the update of the screen output by the application program. For example, if the application program is an image display application program, the update operation may be an image replacement operation input by the user to trigger the replacement of the displayed image. For example, the user inputs a sliding operation on the displayed image to trigger the replacement of the image. In another example, if the application program is an application program to display a web page, the update operation may be an operation of changing the web page input by the user.

It should be understood that the more frequently the user performs input operations on the application program, the more frequently the application program needs to update its output display screen, therefore, the application program will refresh the display device at a higher rate. Based on this, the refresh rate of the display device can be reasonably increased or decreased by combining the operation frequency and the refresh rate range corresponding to the operating mode.

For example, assume that the electronic device is in the second operating mode and the determined refresh rate range is 2.5 Hz-12 Hz. Assume that the application program is an image display application program. Based on the application program type, the refresh rate of the display device can be controlled to be 8 Hz.

Based on this, the user's input on the displayed image can be monitored to trigger the sliding operation to update the image. If the sliding frequency based on the sliding operation is greater than a first threshold, then the refresh rate of the display device may be increased to 12 Hz. If the sliding frequency based on the sliding operation is less than a second threshold (the second threshold being less than the first threshold), the refresh rate of the display device may be reduced to 2.5 Hz. If the sliding frequency of the sliding operation is between the first threshold and the second threshold, the refresh rate may be maintained at 8 Hz.

Considering that in actual applications, a user can use the electronic device to operate in different scenes, the user will also need different refresh rates for the display device. Based on this, the display control method can be used to determine the refresh rate of the display device based on the operating scene mode set by the user in the current operating mode of the electronic device.

Figure 7:
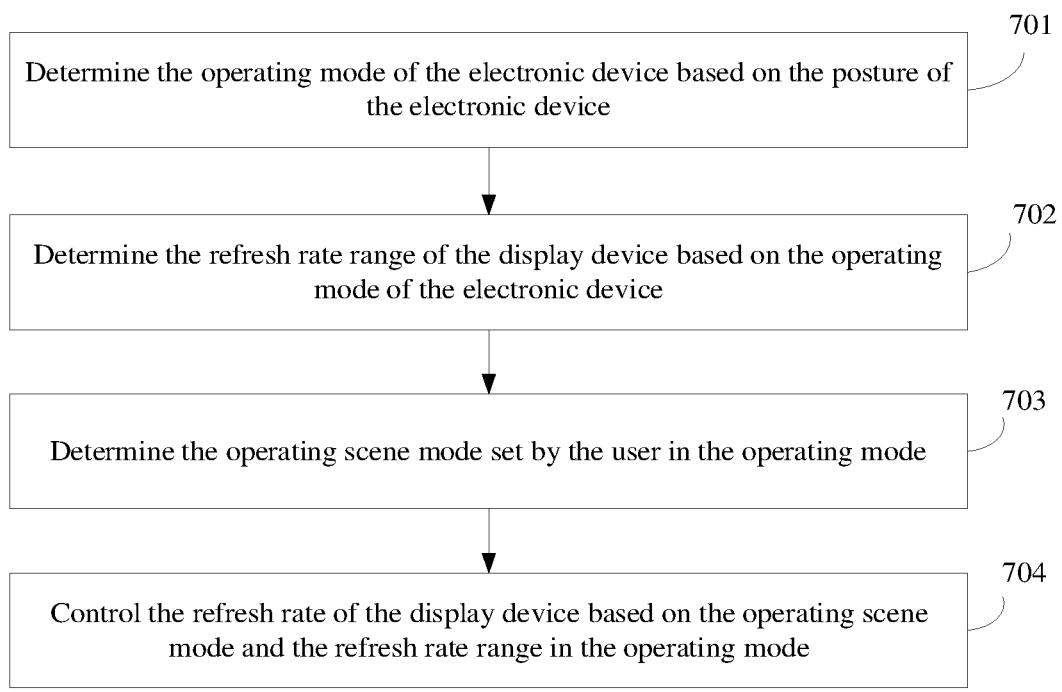
FIG. 7 is a flowchart of the display control method according to an embodiment of the present disclosure.

FIG. 7 is another flowchart of the display control method according to an embodiment of the present disclosure. The method will be described in detail below.

701, determining the operating mode of the electronic device based on the posture of the electronic device.

702, determining the refresh rate range of the display device based on the operating mode of the electronic device.

For the detailed description of the processes at 701 and 702, reference can be made to the relevant description in the foregoing embodiment, which will not be repeated here.

703, determining the operating scene mode set by the user in the operating mode.

In some embodiments, the operating scene mode may be used to characterize the user's usage of the electronic device. For example, the operating scene mode may be divided into reading mode, handwriting mode, office mode, etc., which is not limited in the embodiments of the present disclosure.

In the embodiments of the present disclosure, the electronic device may be configured with a variety of operating scene modes for the user to select. The user may select and set an operating scene mode based on the purpose of using the electronic device.

704, controlling the refresh rate of the display device based on the operating scene mode and the refresh rate range in the operating mode.

Since the refresh rate range corresponds to the operating mode, in this embodiment, the refresh rate of the display device can be determined based on the operating mode of the electronic device and the currently set operating scene mode.

It should be understood that due to different operating scene modes, the content of operations performed by the user on the electronic device will also be different, and the refresh rate suitable for the display device will also be different. Based on this, after determining the refresh rate range corresponding to the operating mode of the electronic device, the refresh rate of the display device can be more reasonably controlled in combination with the operating scene mode set by the user.

In some embodiments, for the same operating mode of the electronic device, the electronic device may be pre-configured with refresh rates suitable for different operating scene modes. Based on this, after determining the refresh rate range of the electronic device, the refresh rate suitable for the user's currently set operating scene mode can be determined based on the refresh rates corresponding to different operating scene modes in the operating mode, and the refresh rate of the display device can be controlled to the determined refresh rate.

For example, assume the operating scene modes include the reading mode, handwriting mode, and office mode. Since the reading mode mainly involves users reading e-books, the user may have relatively low requirements for the refresh rate of the display device; correspondingly, in the office mode, the user may need to perform some office operations and the user may have relatively high requirements for the refresh rate of the display device.

Based on this, for the first operating mode of the electronic device, assume that the first refresh rate range corresponding to the first operating mode is 2.5 Hz-8 Hz, the refresh rate corresponding to the reading mode can be set to 2.5 Hz, the refresh rate corresponding to the handwriting mode can be set to 5 Hz, and the refresh rate corresponding to the office mode can be set to 8 Hz.

Similarly, for the second operating mode of the electronic device, assume that the second refresh rate range corresponding to the second operating mode is 2.5 Hz-12 Hz, the refresh rate corresponding to the reading mode can be set to 2.5 Hz, the refresh rate corresponding to the handwriting mode can be set to 8 Hz, and the refresh rate corresponding to the office mode can be set to 12 Hz.

Of course, there may be other ways to determine the refresh rate of the display device based on the refresh rate range corresponding to the operating mode of the electronic device and the currently set operating scene mode of the electronic device, which is not limited in the embodiments of the present disclosure.

It should be understood that in practical applications, the suitable refresh rate of the display device of the electronic device may also be comprehensively determined based on the operating mode of the electronic device, the operating scene mode set by the user, and the type of application program currently running on the electronic device to reasonably control the refresh rate of the display device.

Embodiments in this specification may be described in a progressive manner. The features described in embodiments of the specification may be replaced or combined with each other. Each embodiment focuses on the differences from other embodiments. The same or similar parts between embodiments may be referred to each other. For device embodiments, since device embodiments are basically similar to method embodiments, the description is relatively simple. For related parts, please refer to a portion of the description of method embodiments.

In this specification, relational terms such as first and second are only used to distinguish one entity or operation from another entity or operation and do not necessarily require or imply any such actual relationship or order between these entities or operations. Moreover, the terms "including," "containing," or any other variations thereof are intended to cover non-exclusive inclusion, so that an item or a device including a series of processes, methods, articles, or devices of the elements includes not only those elements, but also other elements that are not explicitly listed, or elements inherent to such processes, methods, articles, or devices. If there are no more restrictions, the element defined by the sentence "including a" does not exclude the existence of another same element in the item or device that includes the processes, methods, articles, or devices of the above elements.

The foregoing description of the disclosed embodiments enables those skilled in the art to implement or use the present disclosure. Various modifications to these embodiments are obvious to those skilled in the art. The general principles defined herein may be implemented in another embodiment without departing from the spirit or scope of the present disclosure. Therefore, the present disclosure is not limited to embodiments shown in this specification, but should conform to the widest scope consistent with the principles and novel features disclosed in the present disclosure.

The above are only some embodiments of the present disclosure. Those of ordinary skill in the art, without departing from the principles of the present disclosure, several improvements and modifications may be made, and these improvements and modifications should be within the scope of the present disclosure.

What is claimed is:

1. An electronic device comprising:
a first body, the first body being plate-shaped with a first side and a second side opposite the first side;
a second body, the second body being plate-shaped, rotatably connected to the first body through a connecting device, with a third side and a fourth side opposite the third side;
a display device disposed on the first side, the display device being configured to present an image, the image being illuminated by light and perceivable by a viewer; and
a processing device connected to the display device, the processing device being configured to adjust a refresh rate of the display device based on a posture of the electronic device, wherein:
the first body and the second body rotate relative to each other through the connecting device for the electronic device to switch between a first posture, a second posture, and a third posture;
when the electronic device is in the second posture, the processing device is configured to adjust the refresh rate to be in a first refresh rate range, the first refresh rate range not including zero; and
when the electronic device is in the third posture, the processing device is configured to adjust the refresh rate to be in a second refresh rate range, the second refresh rate range not including zero, a maximum refresh rate in the second refresh rate range being greater than a maximum refresh rate in the first refresh rate range.

2. The electronic device of claim 1, wherein:
when the electronic device is in the first posture, the first body and the second body satisfy an overlapping condition, and the second side of the first body is exposed; and
when the electronic device is in the second posture, the first body and the second body satisfy the overlapping condition, and the first side of the first body is exposed.

3. The electronic device of claim 2, wherein:
the connecting device enables relative circumferential rotation between the first body and the second body, wherein:
when the electronic device is in the first posture, the first side of the first body faces the third side of the second body, and an interactive device is arranged on the third side of the second body; and
when the electronic device is in the second posture, the second side of the first body faces the fourth side of the second body.

4. The electronic device of claim 2, wherein:
when the electronic device is in the third posture, an angle between the first body and the second body is between a first limit angle corresponding to the first posture and a second limit angle corresponding to the second posture, the first limit angle being a minimum angle between the first body and the second body in the first posture, the second limit angle being a maximum angle between the first body and the second body in the second posture.

5. A display control method comprising:
determining an operating mode of an electronic device based on a posture of the electronic device, wherein determining the operating mode of the electronic device based on the posture of the electronic device includes: when the electronic device is in a first posture, determining that the electronic device is in a non-use mode; when the electronic device is in a second posture, determining that the electronic device is in a first operating mode; when the electronic device is in a third posture, determining that the electronic device is in a second operating mode;
determining a refresh rate range of a display device based on the operating mode of the electronic device, the electronic device including plate-shaped first body and second body, the first body and the second body being rotatably connected, the display device being disposed on a first side of the first body, the display device being configured to present an image to be perceivable by a viewer after being illuminated by light, wherein determining the refresh rate range of the display device based on the operating mode of the electronic device includes: when the electronic device is in the first operating mode, determining that the display device is in a first refresh rate range, the first refresh rate range not including zero; when the electronic device is in the second operating mode, determining that the display device is in a second refresh rate range, the second refresh range not including zero, a maximum refresh rate in the second refresh rate range being greater than a maximum refresh rate in the first refresh rate range; and
controlling the refresh rate of the display device based on the refresh rate range.

6. The display control method of claim 5, wherein controlling the refresh rate of the display device based on the refresh rate range includes:
- determining an application program type running in the electronic device that needs a display screen, the application program type indicating requirements of the refresh rate of the display screen for the application program;
- determining a target refresh rate of the display device from the refresh rate range based on the application program type; and
- controlling the refresh rate of the display device to be the target refresh rate.

7. The display control method of claim 6, after controlling the refresh rate of the display device to be the target refresh rate, the display control method further comprising:
- determining a frequency of user input operations for the application program; and
- adjusting the refresh rate of the display device based on the operation frequency and the refresh rate range.

8. The display control method of claim 5 further comprising:
- determining an operating scene mode set by a user in the operating mode, wherein:
- controlling the refresh rate of the display device based on the refresh rate range includes:
- controlling the refresh rate of the display device based on the operating scene mode and the refresh rate range.

9. The display control method of claim 5, wherein
- determining the refresh rate range of the display device based on the operating mode of the electronic device further includes:
- when the electronic device is in the non-use mode, determining that the refresh rate of the display device is zero.

10. A non-transitory computer-readable storage medium storing computer program instructions executable by at least one processor to perform a display control method comprising:
- determining an operating mode of an electronic device based on a posture of the electronic device, wherein determining the operating mode of the electronic device based on the posture of the electronic device includes: when the electronic device is in a first posture, determining that the electronic device is in a non-use mode; when the electronic device is in a second posture, determining that the electronic device is in a first operating mode; when the electronic device is in a third posture, determining that the electronic device is in a second operating mode;
- determining a refresh rate range of a display device based on the operating mode of the electronic device, the electronic device including plate-shaped first body and second body, the first body and the second body being rotatably connected, the display device being disposed on a first side of the first body, the display device being configured to present an image to be perceivable by a viewer after being illuminated by light, wherein determining the refresh rate range of the display device based on the operating mode of the electronic device includes: when the electronic device is in the first operating mode, determining that the display device is in a first refresh rate range, the first refresh rate range not including zero; when the electronic device is in the second operating mode, determining that the display device is in a second refresh rate range, the second refresh range not including zero, a maximum refresh rate in the second refresh rate range being greater than a maximum refresh rate in the first refresh rate range; and
- controlling the refresh rate of the display device based on the refresh rate range.

11. The computer-readable storage medium of claim 10, wherein controlling the refresh rate of the display device based on the refresh rate range includes:
- determining an application program type running in the electronic device that needs a display screen, the application program type indicating requirements of the refresh rate of the display screen for the application program;
- determining a target refresh rate of the display device from the refresh rate range based on the application program type; and
- controlling the refresh rate of the display device to be the target refresh rate.

12. The computer-readable storage medium of claim 11, after controlling the refresh rate of the display device to be the target refresh rate, the display control method further comprising:
- determining a frequency of user input operations for the application program; and
- adjusting the refresh rate of the display device based on the operation frequency and the refresh rate range.

13. The computer-readable storage medium of claim 10 further comprising:
- determining an operating scene mode set by a user in the operating mode, wherein:
- controlling the refresh rate of the display device based on the refresh rate range includes:
- controlling the refresh rate of the display device based on the operating scene mode and the refresh rate range.

14. The computer-readable storage medium of claim 10, wherein
- determining the refresh rate range of the display device based on the operating mode of the electronic device further includes:
- when the electronic device is in the non-use mode, determining that the refresh rate of the display device is zero.

15. The electronic device of claim 1, wherein when the electronic device is in the first posture, the processing device is configured to adjust the refresh rate to zero.

* * * * *